United States Patent
McGrath et al.

(10) Patent No.: US 9,836,298 B2
(45) Date of Patent: Dec. 5, 2017

(54) DEPLOYMENT RULE SYSTEM

(71) Applicant: Intel Corporation, Santa Clara, CA (US)

(72) Inventors: Michael J. McGrath, Virginia (IE); Vincenzo M. Riccobene, Leixlip (IE)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/082,366

(22) Filed: Mar. 28, 2016

(65) Prior Publication Data

US 2017/0277531 A1 Sep. 28, 2017

(51) Int. Cl.
G06F 9/455 (2006.01)
G06F 9/445 (2006.01)
G06F 9/50 (2006.01)

(52) U.S. Cl.
CPC .............. *G06F 8/65* (2013.01); *G06F 9/5055* (2013.01); *G06F 9/5083* (2013.01)

(58) Field of Classification Search
None
See application file for complete search history.

(56) References Cited

U.S. PATENT DOCUMENTS

| | | | | |
|---|---|---|---|---|
| 9,292,350 | B1* | 3/2016 | Pendharkar | G06F 9/5044 |
| 2011/0238672 | A1* | 9/2011 | Agarwala | H04L 67/1097 |
| | | | | 707/748 |
| 2011/0239214 | A1* | 9/2011 | Frields | G06F 9/45533 |
| | | | | 718/1 |
| 2013/0185433 | A1* | 7/2013 | Zhu | H04L 67/303 |
| | | | | 709/226 |
| 2014/0337844 | A1* | 11/2014 | Jin | G06F 9/45558 |
| | | | | 718/1 |
| 2014/0351443 | A1* | 11/2014 | Tang | G06F 9/45533 |
| | | | | 709/226 |
| 2015/0113100 | A1* | 4/2015 | Tweedale | H04L 41/08 |
| | | | | 709/219 |
| 2016/0087933 | A1* | 3/2016 | Johnson | H04W 4/001 |
| | | | | 709/245 |
| 2016/0140022 | A1* | 5/2016 | Michelsen | G06F 1/00 |
| | | | | 702/186 |

* cited by examiner

*Primary Examiner* — Dong Kim
(74) *Attorney, Agent, or Firm* — Grossman, Tucker, Perreault & Pfleger, PLLC

(57) ABSTRACT

One embodiment provides an apparatus. The apparatus includes a deployment recipe generator to generate a plurality of deployment recipes; a deployment test engine to test each of a plurality of deployment configurations, each deployment configuration corresponding to a respective deployment recipe; and data analysis logic to determine a deployment rule based, at least in part, on deployment heuristics.

21 Claims, 4 Drawing Sheets

US 9,836,298 B2

DEPLOYMENT RULE SYSTEM

FIELD

The present disclosure relates to a system, in particular to, a deployment rule system.

BACKGROUND

Computing resources in cloud computing environments may be selected for deployment based on static service descriptors related to an associated workload. In order to ensure customer service level agreement (SLA) requirements are met, resources corresponding to the service descriptors may be over-provisioned. Matching workload operational characteristics to resource performance characteristics can be challenging. Workload affinity for specific resource features and/or quantitative allocation of these features may or may not be considered. Further, in many situations, scaling/migration of virtual machines (VMs) hosting workloads is a reactive orchestration process that is typically triggered by an SLA breach. Over provisioning can result in increased cost without a corresponding increase in performance.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
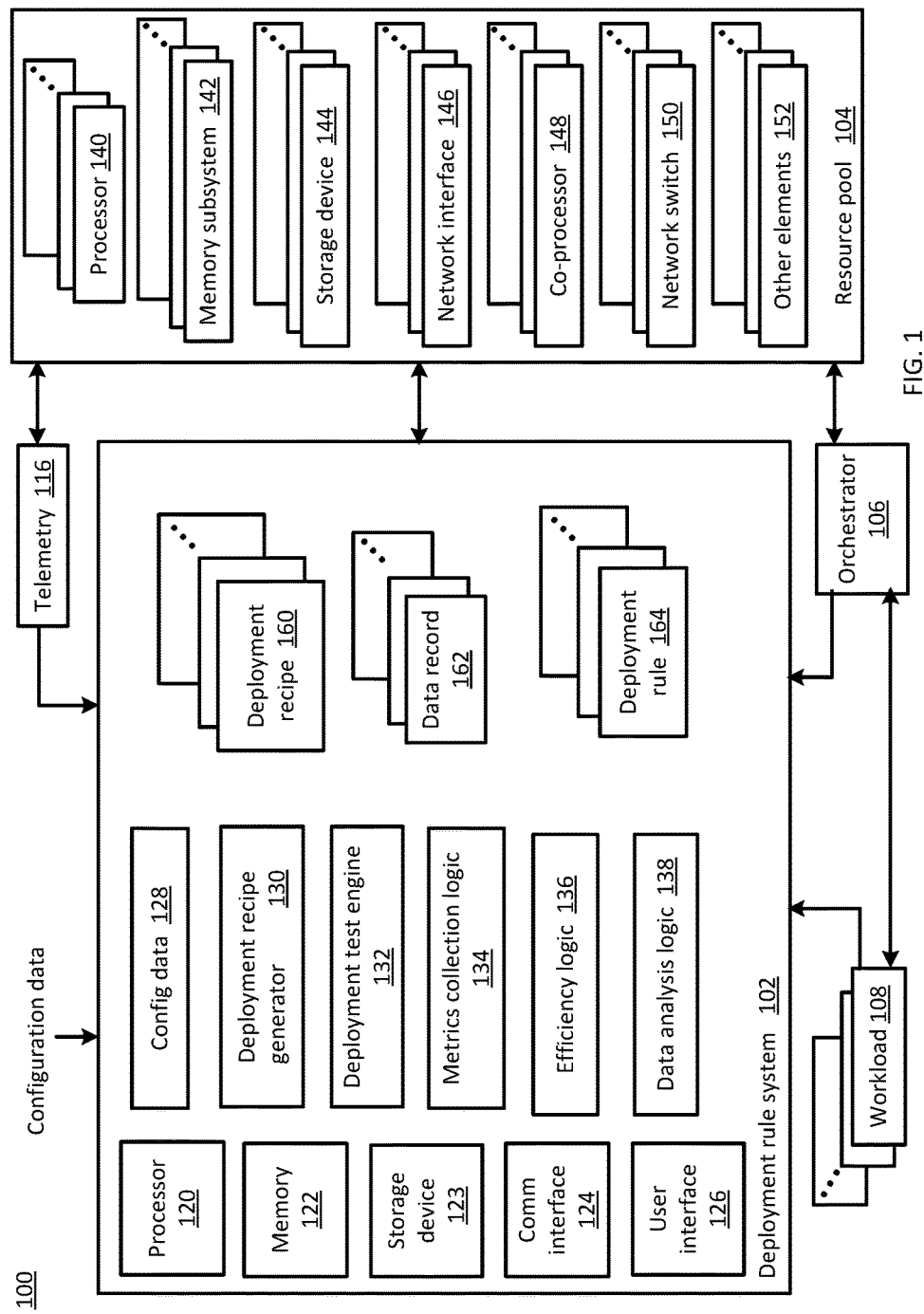
FIG. 1 illustrates a functional block diagram of system including a deployment rule system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to a deployment rule system. An apparatus, method and/or system are configured to generate deployment rules for a workload based, at least in part, on received configuration data. The configuration data may include one or more resource descriptors, each resource descriptor corresponding to a respective resource type to be investigated. Each resource descriptor may contain one or more resource variant identifiers and one or more values or a range of values corresponding to a quantity of the resource type to be investigated. Resources may include, but are not limited to, processing units, memory subsystems, storage devices, network interfaces, coprocessors, network switches, etc. Resources may be virtual and/or physical. For example, resource variants for a network interface may include a hardware assisted network interface (e.g., SR-IOV (single route input/output virtualization)) and/or a software assisted network interface (e.g., OVS (open virtual switch)).

In some embodiments, each resource descriptor may further include feature identifiers associated with a respective variant. In some embodiments, the resource variant identifier may be configured to also identify features associated with the resource variant.

The configuration data may further include one or more performance parameter descriptors for each performance parameter associated with the workload. Each performance parameter may be related to operational characteristics associated with the workload. For example, for a workload that includes a network application, at least one performance parameter may correspond to throughput and/or bandwidth. In another example, for a workload that includes an enterprise application, at least one performance parameter may correspond to latency and/or number of operations in a time period. Each performance parameter descriptor may include a performance parameter identifier and one or more values or a range of values associated with the respective performance parameter.

The apparatus, method and/or system are configured to generate one or more deployment recipes based, at least in part, on configuration data. Each deployment recipe corresponds to a respective deployment configuration. Each deployment recipe may include one or more resource type identifier(s), one or more resource variant identifiers and a respective resource type quantity numeric value associated with each resource type identifier. A total number of resources may then correspond to a sum of the numbers of resources of each type. A corresponding deployment configuration may then include the respective numbers, types and variants of resources defined by the deployment recipe.

Resources associated with each deployment configuration may then be allocated in a resource pool. For example, the resources may be allocated to a virtual machine (VM). In another example, the resources may be allocated to a container instance. Each deployment configuration may then be tested. For example, a corresponding workload may be placed in a VM or container, an appropriate load may be applied and metrics data (i.e., telemetry data) related to performance may be collected. Telemetry data may include, but is not limited to, processor usage, network usage, cache misses, memory usage, memory latency, throughput, number of instructions per second, workload specific metrics, etc. At the completion of data collection for a deployment configuration under test, the load may be removed, the workload may be halted and the resources allocated to the deployment configuration may be released, thus, returning to a baseline. The testing operations may be repeated for each deployment configuration and corresponding deployment recipe.

The apparatus, method and/or system are configured to determine one or more deployment rules that relate performance parameter value(s) to one or more deployment recipes. The deployment rules may be determined based, at least in part, on deployment heuristics. The deployment heuristics may be generated based, at least in part, on the collected telemetry data, the deployment recipes and the performance parameter(s).

In some embodiments, if a plurality of deployment rules are associated with one performance parameter value, then the apparatus, method and/or system are configured to determine an efficiency value associated with each respective deployment rule. The plurality of deployment rules may then be ranked according to efficiency and a highest ranking deployment rule for the corresponding workload may be selected for provision to an orchestrator.

In operation, given a performance parameter value, a deployment rule may be utilized, e.g., by the orchestrator, to determine and/or identify a deployment recipe that is configured to achieve the given performance parameter value. Thus, during operation, a deployment recipe may be selected for a workload configured to achieve a target performance with an optimized number of resources and type(s) of resources. Resource over-provisioning may be avoided while achieving target performance.

The apparatus, method and/or system may be further configured to monitor actual performance of a workload and associated deployment configuration during operation. The actual performance may change during operation due to allocation of resources to other virtual machines and/or containers, i.e., dynamic variation in the sharing of physical resources. The allocation and/or placement may be adjusted if the target performance is not met, as described herein.

FIG. 1 illustrates a functional block diagram of a system 100 including a deployment rule system 102 consistent with several embodiments of the present disclosure. System 100 includes the deployment rule system 102, a resource pool 104, an orchestrator 106 and telemetry 116. System 100 may further include one or more workloads, e.g., workload 108. Workloads may include, but are not limited to, a network workload, an enterprise workload, etc., and/or combinations thereof. For example, a network workload may include a network application configured to process network traffic, e.g., packets. In another example, an enterprise workload may include an enterprise application configured to process data including, but not limited to, database operations, arithmetic functions, cryptographic functions, memory access functions, web services, etc.

Resource pool 104 may include, e.g., a data center, a cloud computing entity, an enterprise computing system, a Mobile Edge Cloud compatible system, a Cloud Radio Access Network (C-RAN) compatible system, etc. Resource pool 104 includes a plurality of physical elements and may include a plurality of virtual elements. The elements may include a plurality of processors, e.g., processor 140, a plurality of memory subsystems, e.g., memory subsystem 142, a plurality of storage devices, e.g., storage device 144, a plurality of network interfaces, e.g., network interface 146, one or more coprocessors, e.g., coprocessor 148, a plurality of network switches, e.g., network switch 150, and/or one or more other elements, e.g., other element 152. Other elements may include, but are not limited to, physical plant, i.e., facilities, e.g., cooling elements. A resource may thus correspond to a physical element, a virtual element and/or a sub-element (e.g., a processor core).

Each processor 140 may include one or more physical processing units, i.e., cores, and/or virtual processing units. Each processor 140 may further include (i.e., contain) a performance monitoring unit (PMU) configured to provide telemetry data, as described herein. Coprocessor 148 may include, but is not limited to, an arithmetic coprocessor, a graphics processor, a cryptographic processor, a vector processor, etc.

Memory subsystem 142 may include any type of memory, as described herein. Each memory subsystem, e.g., memory subsystem 142, may include a number of memory elements. The number of memory elements may correspond to a minimum granularity (i.e., atomic unit) of memory elements for each memory subsystem, e.g., memory subsystem 142. For example, the number of memory elements included in each memory subsystem may correspond to 1 MB (megabytes), 100 MB, 500 MB, 1 GB, etc., of memory. Storage devices 144 may include, e.g., hard disk drives, solid state drives, removable storage, etc.

The physical elements may be arranged in racks, either conventionally (e.g., processors, storage devices and network interfaces aggregated into servers, microservers, etc.) or in disaggregated pools of physical elements (e.g., a rack tray of compute resources (processors), a rack tray of storage resources, a rack tray of network resources). For example, the physical elements may be configured as a disaggregation of resources in a rack. For example, the disaggregation of physical resources comply with an Intel® Rack Scale Architecture.

One or more resources may be allocated by, e.g., orchestrator 106, to a virtual machine and/or container instance that corresponds to a deployment configuration. For example, a first deployment configuration may include a virtual processor, a memory subsystem and one or more virtual network interfaces (i.e., network elements). In another example, a second deployment configuration may include a virtual processor, a plurality of memory subsystems, a coprocessor and a network switch. Thus, resource pool 104 may contain a plurality of virtual machines (and/or containers), with each virtual machine or container corresponding to a respective deployment configuration and associated deployment recipe.

Orchestrator 106 is configured to activate, control and configure the resources of resource pool 104. For example, the orchestrator 106 is configured to manage combining resource pool 104 physical elements into compute nodes, i.e., to configure the compute nodes. In another example, the orchestrator 106 is configured to manage sharing the physical elements of resource pool 104 by a plurality of virtual elements. Virtual elements may include, but are not limited to, virtual machines, containers, etc. The orchestrator 106 is further configured to manage placement of workloads and/or virtual machines onto the compute nodes. In other words, the orchestrator 106 is configured to select a compute node on which to place a respective workload and to manage compute node sharing by a plurality of workloads and/or virtual machines and/or containers. Orchestrator 106 may correspond to a cloud management platform, e.g., OpenStack® (cloud operating system), CloudStack® (cloud computing software) or Amazon Web Services (AWS).

Deployment rule system 102 may include processor 120, memory 122, storage device 123, communication interface 124 and user interface 126. Processor 120 is configured to perform operations of deployment rule system 102. Memory 122 and/or storage device 123 are configured to store data, deployment recipes and deployment rules associated with operation of deployment rule system 102. Memory 122 may include any type of memory, as described herein. Storage device 123 may include, e.g., hard disk drive, solid-state drive, removable storage, etc. Communication interface 124 is configured to provide communication capability to deployment rule system 102. For example, communication interface 124 may be configured to communicate wired and/or wirelessly with resource pool 104, orchestrator 106 and/or telemetry 116. User interface 126 may include, but is not limited to, a display, a keyboard, a keypad, a touchpad, a touch sensitive display, etc. For example, user interface 126 may be utilized to receive configuration data ("config data") from, e.g., a system administrator.

Deployment rule system 102 may include a deployment recipe generator 130, a deployment test engine 132, metrics collection logic 134, efficiency logic 136 and/or data analysis logic 138. Deployment rule system 102 may be configured to receive configuration data from, e.g., a system administrator, and to store the configuration data in memory 122 as config data 128. For example, the configuration data may be included in a configuration file that may be read, for example, by deployment recipe generator 130. In this example, user interface 126 may be utilized to store and/or provide the configuration file. In another example, the configuration data may be provided via an application programming interface (API). The config data 128 may contain a plurality of resource descriptors and one or more performance parameter descriptors, as described herein.

Deployment recipe generator 130 is configured to generate one or more deployment recipes based, at least in part, on config data 128. The deployment recipes may then be stored in, e.g., memory 122. Thus, deployment rule system 102 may contain one or more deployment recipes, e.g., deployment recipe 160, each deployment recipe generated by deployment recipe generator 130.

Each deployment recipe corresponds to a respective deployment configuration. Each deployment recipe may include one or more resource type identifier(s), one or more resource variant identifiers and a respective resource type quantity numeric value associated with each resource type identifier. A total number of resources may then correspond to a sum of the numbers of resources of each type. A corresponding deployment configuration may then include the respective numbers, types and the variants of resources defined by the deployment recipe.

For example, the variants of a memory subsystem may correspond to the numbers of memory subsystems included in a deployment configuration. The number of memory elements included in one memory subsystem may also be varied in variants of the memory subsystem. In another example, the variants of a processor may be related to a number of virtual processors. In another example, the variants of a network interface may include SR-IOV and OVS, as described herein.

Deployment recipe generator 130 is configured to generate a plurality of deployment recipes that include some or all of the possible combinations of resource types and variants defined by config data 128. The maximum number of possible combinations increases with the number of resources and numbers of variants of each type of resource. The number of combinations is equal to the product of the number of variants for each of the resources. For example, if the number of resources is three and each resource has two variants, the maximum number of possible combinations is eight (i.e., (the number of variants of the first resource)*(the number of variants of the second resource)*(the number of variants of the third resource)=2*2*2=8). In another example, if the number of resources is two, the first resource has two variants and the second resource has three variants, the maximum number of possible combinations is six (i.e., 3*2=6). It may be appreciated that relatively small numbers of resources and variants may correspond to a relatively large number of possible combinations. Deployment recipe generator 130 may thus be configured to generate each deployment recipe based, at least in part, on the received configuration data stored as config data 128.

Deployment test engine 132 is configured to test each deployment configuration. Deployment test engine 132 may deploy a respective deployment recipe, e.g., deployment recipe 160, i.e., a deployment configuration corresponding to each deployment recipe. Each deployment configuration may thus include the numbers, types and variants of resources defined by the corresponding deployment recipe. Deploying the respective deployment configuration may include selecting and/or allocating appropriate physical resources and/or configuring appropriate virtual resources of resource pool 104. Deployment may be initiated by deployment test engine 132 and may be performed by deployment test engine 132 and/or orchestrator 106. For example, deployment may include instantiating a virtual machine that includes and/or manages the resources defined by the corresponding deployment recipe. Workload 108 may then be placed to the deployed resources of the deployment configuration, e.g., to a virtual machine or container. Workload 108 may be placed by deployment test engine 132 and/or orchestrator 106.

An appropriate load may then be applied to workload 108. For example, for a network workload the appropriate load may correspond to network traffic, e.g., packets to be received and/or processed and/or transmitted. In this example, the deployment configuration may include one or more network elements, e.g., network interfaces and/or network switches. In another example, for a workload that includes an enterprise application, the appropriate load may correspond to test data that is processed, read from the memory subsystem and/or written to the memory subsystem. In this example, the deployment configuration may include one or more processing units and one or more memory subsystems. In another example, for a workload that includes a cryptographic engine, the appropriate load may correspond to test data that is to be encrypted and/or decrypted. In this example, the deployment configuration may include one or more processors, a coprocessor and one or more memory subsystems.

Each test of a deployment configuration may be performed over a test interval. A duration of the test interval may be included in the received configuration data. For example, the duration of the test interval may be on the order of ones of seconds, tens of seconds or ones of minutes. The duration of the test interval may be related to the types of resources included in the deployment configuration as defined by the corresponding deployment recipe. Each test of a deployment configuration may be repeated. The number of repetitions may be included in the configuration data 128.

During a test interval, i.e., during execution of workload 108 and application of the appropriate load, metrics collection logic 134 may be configured to collect (i.e., capture and/or acquire) metrics data (i.e., telemetry data). Telemetry data may be acquired periodically and/or intermittently during the test interval. Telemetry data may be captured and/or acquired from resource pool 104 directly by metrics collection logic 134 and/or via telemetry 116. For example, telemetry 116 may be included in metrics collection logic 134. In another example, telemetry 116 may be coupled to metrics collection logic 134.

Telemetry data may include, but is not limited to, power information, performance parameters, security information, temperature information and/or utilization data. For example, telemetry data may include a processor usage value, a number of cache misses in a time interval, a memory usage value, a memory access latency value and/or a throughput associated with a network element. For example, telemetry 116 may include a performance monitor, e.g., Intel® performance counter monitor (PCM), configured to detect, for processors, processor utilization, core operating frequency, cache hits and/or misses. Telemetry 116 may be further configured to detect an amount of data written to and read from, e.g., memory controllers associated with processor 140, memory subsystem 142 and/or storage device 144.

Metrics collection logic 134 may be configured to store the acquired telemetry data to, e.g., memory 122 and/or storage device 123, in a data record, e.g., data record 162.

The acquired telemetry data may be stored during the test interval and/or at the completion of the test interval. Deployment rule system 102 may thus contain one or more data records, e.g., data record 162. For example, each data record, e.g., data record 162, may correspond to a respective deployment configuration. In another example, a plurality of data records may be related to one deployment configuration.

Each data record, e.g., data record 162, may be further configured to store metadata representing the corresponding deployment recipe and/or metadata related to test conditions. For example, deployment test engine 132 may be configured to store deployment recipe metadata and/or test condition metadata to the data record. The deployment recipe metadata may include, e.g., resource type identifiers, variant identifiers and/or numeric values for each resource type, as described herein. Test condition metadata may include load characteristics, e.g., line rate of network traffic, characteristics of data to be processed, number of operations to be performed, etc.

At the completion of the test interval, deployment test engine 132 may be configured to remove the load and to halt execution of the workload 108. Deployment test engine 132 and/or orchestrator 106 may then be configured to delete the corresponding deployment configuration and to de-allocate the associated resources. Deleting the deployment configuration and de-allocating the associated resources are configured to return the resource pool 104 to a baseline in advance of deployment and/or testing of a subsequent deployment configuration.

Deployment test engine 132, orchestrator 106 and metrics collection logic 134 are configured to repeat deployment test operations for each deployment recipe. Thus, at the completion of the test operations, deployment rule system 102 may contain a plurality of data records, e.g., data record 162, corresponding to the deployment configurations tested. The number of deployment configurations tested corresponds to the number of deployment recipes generated, as described herein.

A deployment rule for each workload may then be determined based, at least in part, on deployment heuristics. Table 1 is one example of deployment heuristics for a workload that includes a network application. The deployment heuristics further include configuration data that includes resources of type network element (e.g., network interface circuitry), resource variants OVS, SR-IOV and throughput as the performance parameter. Table 1 is related to the examples illustrated in FIG. 4 and FIG. 5, as will be described in more detail below.

TABLE 1 vnic-4 = OVS'
| vnic-3 = OVS'
| | vnic-1 = OVS: less
| | vnic-1 = SR-IOV: 400 Mbps
| vnic-3 = SR-IOV: less
vnic-4 = SR-IOV'
| vnic-5 = OVS'
| | vnic-3 = OVS: 800-Mbps
| | vnic-3 = SR-IOV: less
| vnic-5 = SR-IOV: 3-Gbps Table 1 represents a decision tree relating throughput to a sequence of selections (i.e., decisions) between the two variants (OVS, SR-IOV) of network elements. For example, selecting vNIC4=OVS, vNIC3=OVS and vNIC1=SR-IOV results in a throughput of 400 Mbps. If vNIC1=OVS is selected instead, then the resulting throughput may be less than 400 Mbps.

The deployment heuristics may be generated based, at least in part, on the collected telemetry data, the deployment recipes and associated performance parameter(s). Data analysis logic 138 may be configured to analyze the captured data and associated metadata to generate the deployment heuristics. For example, data analysis logic 138 may be configured to generate deployment heuristics utilizing a machine learning technique. Machine learning techniques may include, but are not limited to, C4.5 technique (a statistical classifier configured to generate decision trees from a set of training data), CART (Classification and regression tree), CHAID (Chi-squared automatic interaction detector), MARS (Multivariate adaptive regression splines) and/or conditional inference trees.

Generating deployment heuristics may include aggregating and formatting the data records to facilitate the machine learning operations. Data analysis logic 138 may be configured to format each data record, e.g., data record 162. For example, each data record may be formatted into a common namespace. The namespace defines a scope of related data objects. The common namespace is configured to facilitate aggregation and a hierarchical organization of the captured data. The use of a common namespace allows the reuse of names in different contexts. In another example, each data record may be formatted to include a fixed number of comma delimited fields. In another example, a question mark may be added to fields for which no data exists. In another example, non-meaningful data may be removed if not within a defined range.

One or more deployment rules may be determined based, at least in part, on the deployment heuristics. Data analysis logic 138 may be configured to determine the one or more deployment rules. For example, the deployment heuristics may be parsed into one or more deployment rules. Each deployment rule may include one or more resources of one or more resource types and variants. Each deployment rule further includes a performance parameter value, as described herein. For example, Table 1 includes three performance parameter values, i.e., 400 Mbps, 800 Mbps and 3 Gbps, and thus, three deployment rules.

Each deployment rule may include a same number of resources (i.e., resource variants) or fewer resources than the corresponding deployment recipe. In other words, given a target value of a performance parameter for a workload, a corresponding deployment rule may be utilized to identify respective variants of each resource type included in a deployment recipe that affect performance. A deployment configuration that includes the identified variants is configured to achieve the target performance. The number of identified resource variants may be the same or less than the number of resource type variants that were included in a corresponding test deployment recipe. Deployment rules that include a lesser number of resources than the associated deployment recipe may suggest that the performance is relatively less dependent or not dependent on variant selection associated with the excluded resources. Thus, any variant may be implemented for these excluded resources without affecting performance. A particular variant may then be selected based, at least in part, on other considerations, for example, cost (e.g., relatively lower) and/or efficiency (e.g., relatively higher).

Eliminating such resources from the deployment rule is configured to simplify the deployment rule. Simplifying the deployment rule is configured to facilitate use of the deployment rule to determine and/or identify an appropriate deployment recipe. The deployment rules may be stored to, e.g., memory 122 and/or storage device 123. Thus, deployment rule system 102 may contain one or more deployment rules, e.g., deployment rule 164.

In some embodiments, a plurality of deployment recipes associated with a workload may achieve a same target performance parameter value. In other words, a plurality of deployment rules may be generated that have a same performance parameter value but different deployment recipes. In these embodiments, efficiency logic 136 may be configured to determine an efficiency parameter for each deployment rule of the plurality of deployment rules. The efficiency parameter is configured to represent a cost associated with implementing a corresponding deployment recipe, i.e., a corresponding deployment configuration. For example, a target performance parameter value may be achieved by allocating fewer relatively more expensive resources or by allocating relatively more relatively less expensive resources. The efficiency parameter may then be utilized to rank each deployment recipe and, thus, corresponding deployment rule. The deployment rule that includes the highest ranked deployment recipe may then be provided to the orchestrator 106.

The efficiency parameter may be defined based, at least in part, on characteristics related to a use case. For example, the efficiency parameter may correspond to:

$$E = \frac{P}{\sum_{i=1}^{N}(w_i * R_i)}$$

where E is efficiency, P is the performance parameter associated with the generated deployment rule, N is a number of variables (i.e., number of resource types) corresponding to the number of resource variants, $w_i$ is a weight assigned to each resource type and $R_i$ is a normalized number of units of a resource i, allocated in the deployment configuration.

A relatively higher value of the efficiency parameter corresponds to a relatively lower cost of deployment. The performance parameter P may be determined based, at least in part, on telemetry data captured during the test interval. For example, the performance parameter P value may be determined by data analysis logic 138. The performance parameter may correspond to internal system metrics, e.g., processor utilization, memory subsystem utilization, network usage or end to end metrics, e.g., network throughput, number of user requests supported per second, etc.

Each weight, $w_i$, may be assigned to a resource type by, e.g., an administrator and/or service provider. A sum of the weights, $w_i$, i=1, . . . , N, is equal to one. For example, for a deployment configuration that includes resource types of processor, memory subsystem, network element and storage device, the weight associated with processor may be 0.3, the weight associated with memory subsystem may be 0.2, the weight associated with network element may be 0.4 and the weight associated with storage device may be 0.1. Thus, the sum of the weights, 0.3+0.2+0.4+0.1, is equal to one. In this example, network element may be considered a relatively more expensive resource type and storage device may be considered a relatively less expensive resource type. In other words, a relatively smaller weight may correspond to a relatively less expensive resource type and a relatively larger weight may correspond to a relatively more expensive resource type.

$R_i$ is related to an amount of an available resource type that is allocated and is normalized to be within a value range related to a resource type that has a maximum number of resources available. For example, a deployment configuration may include resources of resource type processor and resource type memory subsystem. Continuing with this example, a maximum of 10 processing units and a maximum of 20 GB of memory may be available to the deployment configuration. In this example, the minimum memory subsystem size may be one gigabyte. Thus, 20 GB of memory corresponds to 20 resources of resource type memory subsystem and 10 processing units corresponds to 10 resources of resource type processor. Thus, 20 is the maximum number of resources of any resource type in this example.

Continuing with this example, if the number of allocated processing units is five and the amount of memory allocated is 5 GB, the amount of allocated processing unit corresponds to 50% of the available processing units (i.e., 5/10=0.5). Similarly, the amount of allocated memory units corresponds to 25% of the available memory units (i.e., 5/20=0.25). $R_i$ for resource type processor is then 0.5×20=10 and $R_i$ for resource type memory is 0.25×20=5.

Thus, if analysis of the data records yields a plurality of deployment rules that correspond to one performance parameter value, then an efficiency parameter may be determined for each deployment rule by, e.g., efficiency logic 136. The plurality of deployment rules may then be ranked according to their respective efficiency parameter values. In one example, the deployment recipe corresponding to the highest ranked deployment rule may be provided to orchestrator 106 with the corresponding workload. In another example, the deployment recipes and corresponding ranks may be provided (or may be available) to the orchestrator 106 along with the workload. If only one deployment rule is generated that corresponds to a target performance parameter value, then that deployment rule may be provided to orchestrator 106.

Orchestrator 106 may then be configured to determine/identify a deployment recipe to deploy in response to a request to schedule the associated workload. For example, a workload placement request may include the performance parameter target value and a workload identifier (and/or the workload). The deployment recipe may be determined/identified based, at least in part, on the performance parameter target value and based, at least in part, on the corresponding deployment rule. For example, for deployment heuristics that corresponds to a decision tree, the leaf that corresponds to the target performance parameter value may be identified and a corresponding bough that couples the identified leaf to the root of the decision tree may be traversed to identify the resources associated with the corresponding deployment rule. The identified resources associated with the corresponding deployment recipe may then be allocated (e.g., to a virtual machine or container) in resource pool 104 and the associated workload may be placed. The determined deployment recipe and corresponding deployment configuration are configured to achieve the corresponding performance parameter target value.

During operation, performance of a scheduled and placed workload may be monitored. For example, the performance may be monitored by metrics collection logic 134 and/or orchestrator 106. For example, whether a performance parameter is at a target value may be determined. In another example, node metrics, e.g., utilization and/or saturation parameters, may be acquired and analyzed. If the performance parameter is not at (or within a tolerance of) the target value, new deployment heuristics may be generated by, e.g., data analysis logic 138, using relatively more recent captured data. The update of the heuristic is based, at least in part, on the same procedure used to determine the initial heuristic. The update of the heuristic may be based on an extended data set that has been collected over a possibly extended period of time, e.g., hours, days, weeks of operation. The deployment rule may then be updated, e.g., data analysis logic 138, based, at least in part, on the new deployment heuristics. Allocation and/or placement may be adjusted by, e.g., orchestrator 106, based on the new deployment rule. For example, a rebalancing of a selected workload may be triggered. For example, rescheduling (i.e. a new placement of) an existing workload may be triggered in response to detecting that the selected workload is not achieving the associated performance target. As a result, the selected workload may be placed to different resources or other workloads may be moved from the allocated resources.

Thus, deployment rules may be generated for a workload based, at least in part, on received configuration data. The configuration data may include one or more resource descriptors and one or more performance parameter descriptors. One or more deployment recipes may be generated based, at least in part, on the configuration data. Each deployment recipe corresponds to a respective deployment configuration.

Resources associated with each deployment configuration may then be allocated in a resource pool and each deployment configuration may then be tested. One or more deployment rules may then be determined based, at least in part, on deployment heuristics. If a plurality of deployment rules are associated with one performance parameter value, then an efficiency value associated with each respective deployment rule may be determined. The plurality of deployment rules may then be ranked according to efficiency and a highest ranking deployment rule for the corresponding workload may be selected for provision to an orchestrator.

Actual performance of a workload and associated deployment configuration may be monitored during operation. The allocation and/or placement may be adjusted if the target performance is not met, as described herein. Thus, during operation, a deployment recipe may be selected for a workload configured to achieve a target performance with an optimized number of resources and type(s) of resources. Resource over-provisioning may be avoided while achieving target performance.

Figure 2:
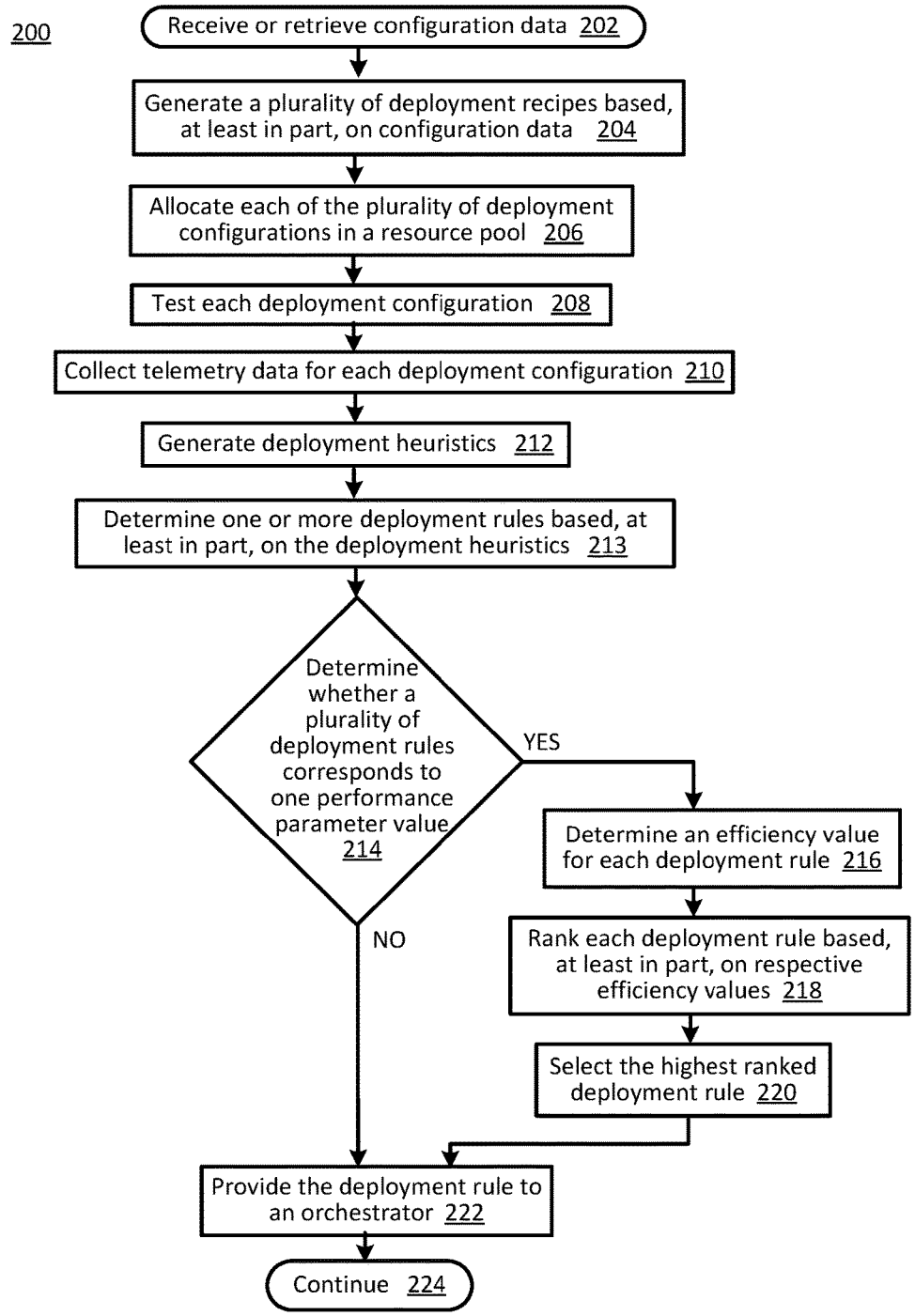
FIG. 2 is a flowchart of deployment rule operations according to various embodiments of the present disclosure.

FIG. 2 is a flowchart 200 of deployment rule operations according to various embodiments of the present disclosure. In particular, the flowchart 200 illustrates generating deployment rules for a workload based, at least in part, on received configuration data. The operations may be performed, for example, by deployment rule system 102 (e.g., deployment recipe generator 130, deployment test engine 132, metrics collection logic 134, efficiency logic 136 and/or data analysis logic 138) and/or orchestrator 106 of FIG. 1.

Operations of this embodiment may begin with receiving or retrieving configuration data 202. For example, configuration data may be received from, e.g., a system administer, via an API or may be retrieved from memory and/or a storage device. A plurality of deployment recipes may be generated based, at least in part, on configuration data at operation 204. For example, the configuration data may be received from a system administrator. Operation 206 includes allocating each of the plurality of deployment configurations in a resource pool. For example, resources associated with each deployment configuration may be allocated to a virtual machine and the associated workload may be placed to the virtual machine. Operation 208 includes testing each deployment configuration. Telemetry data for each deployment configuration may be collected at operation 210. In other words, telemetry data may be acquired during test operations. Deployment heuristics may be generated at operation 212. One or more deployment rules may be determined based, at least in part, on the deployment heuristics, at operation 213. For example, the deployment heuristics may be parsed into one or more deployment rules.

Whether a plurality of deployment rules corresponds to one performance parameter value may be determined at operation 214. If a plurality of deployment rules corresponds to one performance parameter value, an efficiency value may be determined for each deployment rule at operation 216. Each deployment rule may be ranked based, at least in part, on respective efficiency values at operation 218. The highest ranked deployment rule may be selected at operation 220. The deployment rule may then be provided to an orchestrator at operation 222. Program flow may then continue at operation 224. If a plurality of deployment rules does not correspond to one performance parameter value, i.e., if one deployment rule corresponds to the performance parameter value, then program flow may proceed to operation 222.

Figure 3:
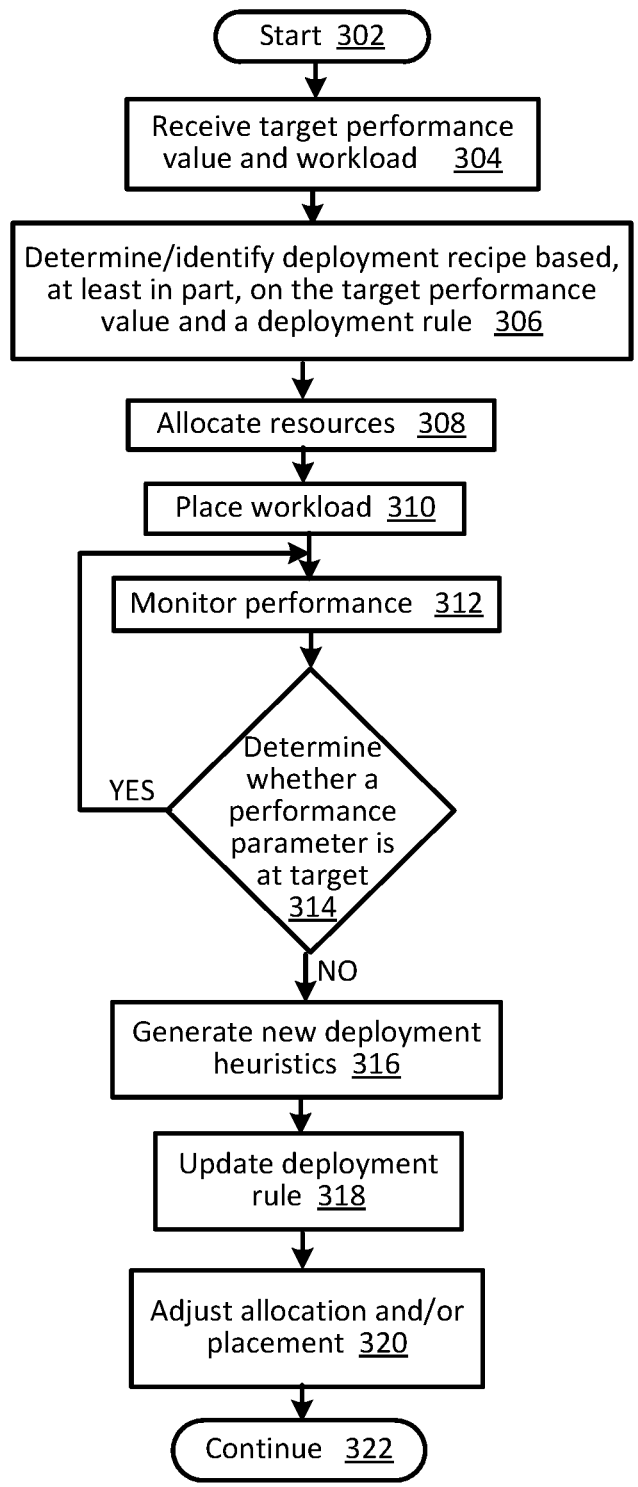
FIG. 3 is a flowchart of monitoring operations according to various embodiments of the present disclosure.

FIG. 3 is a flowchart 300 of monitoring operations according to various embodiments of the present disclosure. In particular, the flowchart 300 illustrates monitoring performance of a scheduled and placed workload. The operations may be performed, for example, by deployment rule system 102 (e.g., metrics collection logic 134) and/or orchestrator 106 of FIG. 1.

Operations of this embodiment may begin with start 302. A target performance value and workload may be received at operation 304. A deployment recipe may be determined/identified based, at least in part, on the target performance value and a deployment rule at operation 306. Resources may be allocated at operation 308. The resources allocated are configured to correspond to the determined/identified deployment recipe. The workload may be placed at operation 310. For example, the workload may include a network application, an enterprise application, etc.

Performance may be monitored at operation 312. For example, performance may be monitored by metrics collection logic 134. Whether the performance parameter value is at the target may be determined at operation 314. If the performance parameter is at the target, program flow may return to operation 312. If the performance parameter value is not at the target, new deployment heuristics may be generated at operation 316. The deployment rule may be updated at operation 318. The allocation and/or placement may be adjusted at operation 320. Program flow may then continue at operation 322.

While the flowcharts of FIGS. 2 and 3 illustrate operations according various embodiments, it is to be understood that not all of the operations depicted in FIGS. 2 and 3 are necessary for other embodiments. In addition, it is fully contemplated herein that in other embodiments of the present disclosure, the operations depicted in FIGS. 2 and/or 3 and/or other operations described herein may be combined in a manner not specifically shown in any of the drawings, and such embodiments may include less or more operations than are illustrated in FIGS. 2 and 3 Thus, claims directed to features and/or operations that are not exactly shown in one drawing are deemed within the scope and content of the present disclosure.

Thus, deployment rules may be generated for a workload based, at least in part, on received configuration data. Actual performance of a workload and associated deployment configuration may be monitored during operation. The allocation and/or placement may be adjusted if the target performance is not met, as described herein. Thus, during operation, a deployment recipe may be selected for a workload configured to achieve a target performance with an optimized number of resources and type(s) of resources. Resource over-provisioning may be avoided while achieving target performance.

Figure 4:
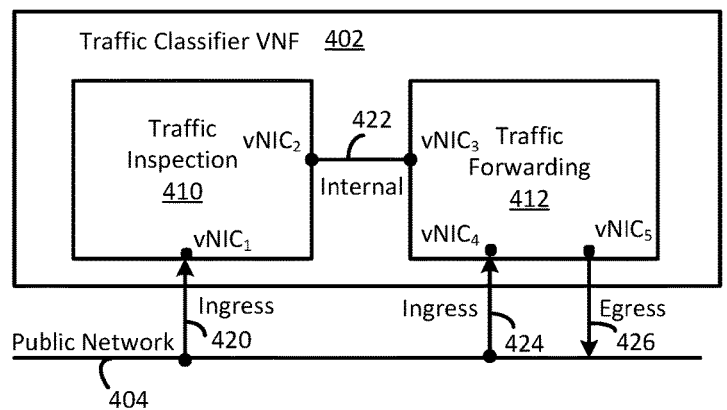
FIG. 4 illustrates a functional block diagram of one example traffic classifier virtual network function.

FIG. 4 illustrates a functional block diagram of one example system 400. The example system 400 includes one example traffic classifier ("TC") virtual network function ("VNF") 402 coupled to a public network 404. TC VNF 402 includes a traffic inspection VNF 410 and a traffic forwarding VNF 412. The traffic inspection VNF 410 includes two virtual network interface circuitries: vNIC1 and vNIC2. The traffic forwarding VNF 412 includes three virtual network interface circuitries: vNIC3, vNIC4, vNIC5. Traffic inspection VNF 410 is coupled to the public network 404 via vNIC1 and an ingress link 420. Traffic inspection VNF 410 is coupled to traffic forwarding VNF 412 via an internal link 422. The internal link 422 is coupled to traffic inspection VNF 410 via vNIC2 and to traffic forwarding VNF 412 via vNIC3. Traffic forwarding VNF 412 is coupled to public network 404 via vNIC4 and an ingress link 424 and via vNIC5 and an egress link 426.

Configuration data associated with example system 400 may include resource descriptors that correspond to resource type identifier network element and variants of a hardware assisted virtual network interface e.g., a SR-IOV, and a software assisted virtual network interface, e.g., an OVS. The resource descriptor may further include a respective number of each resource type, as described herein. The configuration data may further include one or more performance parameter target value related to network traffic, e.g., throughput. One or more deployment rules may be determined based, at least in part, on the configuration data, as described herein. Each deployment rule may relate a corresponding performance parameter value to a deployment recipe configured to achieve the performance parameter target value in operation, as described herein.

Figure 5:
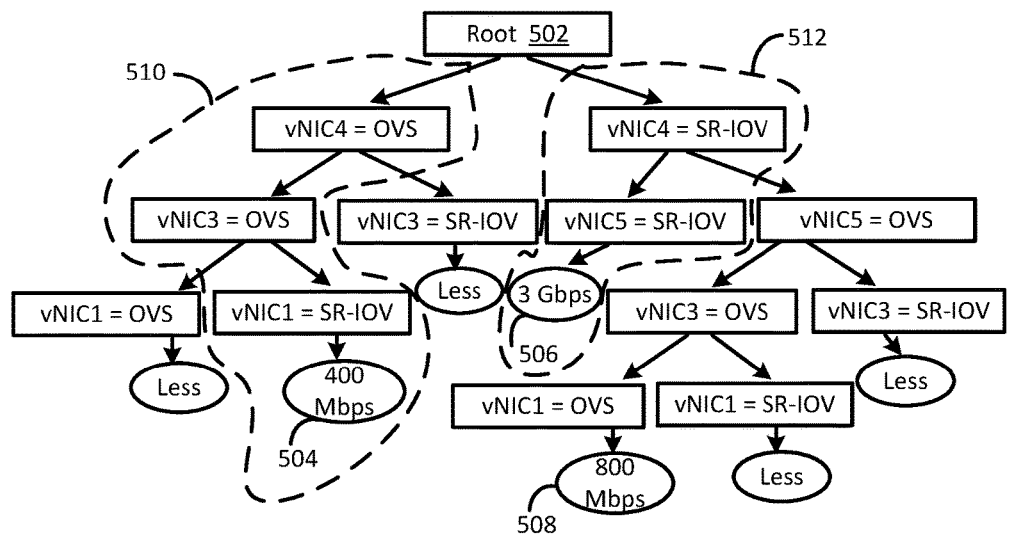
FIG. 5 illustrates one example decision tree corresponding to the example traffic classifier of FIG. 4.

FIG. 5 illustrates one example decision tree 500 corresponding to the example traffic classifier of FIG. 4. The decision tree 500 corresponds to a graphical representation of deployment heuristics, as described herein. The example decision tree 500 includes a root 502 and a plurality of combinations of network elements. The network elements correspond to the virtual network interface circuitries illustrated in FIG. 4.

The example decision tree 500 includes a plurality of levels, with each level corresponding to a decision between the plurality of variants for the resource type network element. For example, a first level closest to the root 502 includes a decision between vNIC4 corresponding to an OVS (i.e., a first variant) and vNIC4 (i.e., a second variant) corresponding to an SR-IOV. The decision tree 500 illustrates two variants of resource type network element, e.g., SR-IOV and OVS, as described herein. It may be appreciated that, compared to an OVS, an SR-IOV may be relatively faster but also relatively more expensive.

The decision tree 500 further illustrates a plurality of performance parameter target values. The target performance parameter values for throughput include 400 Mbps (megabits per second) 504, 3 Gbps (gigabits per second) 506 and 800 Mbps 508. Decision tree 500 further illustrates two boughs 510, 512. Each bough represents a respective deployment rule relating a performance parameter target value to a deployment recipe configured to achieve the performance parameter target value. Each target value is included in a leaf 504, 506 or 508 that terminates a respective bough. For example, leaf 504 terminates bough 510. In another example, leaf 506 terminates bough 512. Both boughs 510, 512 also terminate at root 502. Bough 510 contains resource variants of a deployment recipe configured to achieve a throughput of 400 Mbps. Bough 512 contains resource variants of a deployment recipe configured to achieve a throughput of 3 Gbps. The deployment recipe contained in bough 510 corresponds to vNIC4 and vNIC3 both configured as OVS and vNIC1 configured as an SR-IOV. The deployment recipe contained in bough 512 corresponds to vNIC4 and vNIC5 both being SR-IOVs.

It may be appreciated that a decision tree, e.g., decision tree 500, may contain fewer than all of the network element resources included in example traffic classifier 400. For example, decision tree 500 does not include vNIC2. One or more of the boughs, e.g., boughs 510, 512, may also include fewer than all of the network element resources. In other words, the selection between possible variants of resource elements that are not included may have insignificant, if any, effect on the target performance.

In operation, for example, a workload and a corresponding deployment rule may be provided to an orchestrator. The orchestrator may then be configured to allocate the resources indicated by the deployment rule to, for example, a virtual machine, and to place the workload to the virtual machine. In another example, a workload, a target performance value and a deployment heuristics identifier may be provided to the orchestrator. In this example, the orchestrator may be configured to select the deployment rule that corresponds to the target performance value, to allocate the resources indicated by the deployment rule to, for example, a virtual machine, and to place the workload to the virtual machine. Operation of the workload may then be monitored, as described herein.

Thus, deployment rules may be generated for a workload based, at least in part, on received configuration data. One or more deployment recipes may be generated based, at least in part, on the configuration data. Resources associated with each deployment recipe may then be allocated in a resource pool and tested. One or more deployment rules may then be determined based, at least in part, on deployment heuristics. If a plurality of deployment rules are associated with one performance parameter value, then an efficiency value associated with each respective deployment rule may be determined. The plurality of deployment rules may then be ranked according to efficiency and a highest ranking deployment rule for the corresponding workload may be selected for provision to an orchestrator.

Actual performance of a workload and associated deployment configuration may be monitored during operation. The allocation and/or placement may be adjusted if the target performance is not met, as described herein. Thus, during operation, a deployment recipe may be selected for a workload configured to achieve a target performance with an optimized number of resources and type(s) of resources. Resource over-provisioning may be avoided while achieving target performance.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., processor 120, 140. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units.

Network interfaces, e.g., network interface 146, may be capable of communicating using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, network interface 146 may be capable of communicating using an X.25 communications protocol. The X.25 communications protocol may comply or be compatible with a standard promulgated by the International Telecommunication Union-Telecommunication Standardization Sector (ITU-T). Alternatively or additionally, network interface 146 may be capable of communicating using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network interface 146 may be capable of communicating using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

A network interface, e.g., network interface 146, may comply and/or be compatible with a PCIe (Peripheral Component Interconnect Express) specification, e.g., PCI Express 3.0 Base specification, Revision 3.0, published by Peripheral Component Interconnect Special Interest Group (PCI-SIG), November 2010, and/or later and/or related versions of this specification, e.g., PCI Express 3.1 Base specification, Revision 3.1a, published, December 2015.

A hardware assisted network interface, e.g., SR-IOV, may comply or be compatible with an SR-IOV specification, e.g., Singe Root I/O Virtualization and Sharing Specification, Revision 1.1, published January 2010, by PCI-SIG, and/or later and/or related versions of this specification.

A software assisted network interface, e.g., OVS, may comply or be compatible with an OVS specification, e.g., Open vSwitch, Version 1.10, released May 2013, by OpenvSwitch.org and/or related and/or earlier and/or later versions of this specification, e.g., version 2.4.0, released August 2015.

Memory 122 and memory subsystems, e.g., memory subsystem 142, may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, an apparatus, system and method are configured to generate one or more deployment rules for a workload based, at least in part, on received configuration data. One or more deployment recipes may be generated based, at least in part, on the configuration data. Each deployment recipe corresponds to a respective deployment configuration.

Resources associated with each deployment configuration may then be allocated in a resource pool and each deployment configuration may then be tested. One or more deployment rules may then be determined based, at least in part, on deployment heuristics. If a plurality of deployment rules are associated with one performance parameter value, then an efficiency value associated with each respective deployment rule may be determined. The plurality of deployment rules may then be ranked according to efficiency and a highest ranking deployment rule for the corresponding workload may be selected for provision to an orchestrator.

Actual performance of a workload and associated deployment configuration may be monitored during operation. The allocation and/or placement may be adjusted if the target performance is not met, as described herein. Thus, during operation, a deployment recipe may be selected for a workload configured to achieve a target performance with an optimized number of resources and type(s) of resources. Resource over-provisioning may be avoided while achieving target performance.

EXAMPLES

Examples of the present disclosure include subject material such as a method, means for performing acts of the method, a device, or of an apparatus or system related to a deployment rule system, as discussed below.

Example 1

According to this example, there is provided an apparatus. The apparatus includes a deployment recipe generator to generate a plurality of deployment recipes. The apparatus further includes a deployment test engine to test each of a plurality of deployment configurations. Each deployment configuration corresponds to a respective deployment recipe. The apparatus further includes data analysis logic to determine a deployment rule based, at least in part, on deployment heuristics.

Example 2

This example includes the elements of example 1, further including metrics collection logic to collect telemetry data for each deployment configuration.

Example 3

This example includes the elements of example 1, wherein the deployment test engine is to allocate each of the plurality of deployment configurations in a resource pool.

Example 4

This example includes the elements according to any one of examples 1 to 3, further including efficiency logic to determine an efficiency value for each deployment rule of a plurality of deployment rules.

Example 5

This example includes the elements of example 4, wherein the efficiency logic is further to rank each deployment rule based, at least in part, on respective efficiency values.

Example 6

This example includes the elements according to any one of examples 1 to 3, further including an orchestrator to determine a first deployment recipe based, at least in part, on a target performance value and based, at least in part, on a first deployment rule associated with a workload.

Example 7

This example includes the elements of example 6, wherein the orchestrator is to allocate resources specified by the first deployment recipe and to place the workload.

Example 8

This example includes the elements of example 7, further including metrics collection logic to monitor performance, the data analysis logic further to update the first deployment rule if a performance parameter is not at the target performance value.

Example 9

This example includes the elements according to any one of examples 1 to 3, wherein each of the plurality of deployment recipes is determined based, at least in part, on configuration data.

Example 10

This example includes the elements of example 9, wherein the configuration data includes at least one resource descriptor, each resource descriptor corresponding to a respective resource type.

Example 11

This example includes the elements of example 10, wherein each resource descriptor includes a resource variant identifier and a value corresponding to a quantity of the respective resource type.

Example 12

This example includes the elements of example 9, wherein the configuration data further includes at least one performance parameter descriptor for each performance parameter associated with a workload.

Example 13

This example includes the elements of example 3, wherein each of the plurality of deployment configurations is allocated to a virtual machine or to a container instance in the resource pool.

Example 14

This example includes the elements of example 2, wherein the telemetry data includes one or more of processor usage, network usage, cache misses, memory usage, memory latency, throughput, number of instructions per second and/or workload specific metrics.

Example 15

This example includes the elements according to any one of examples 1 to 3, wherein the deployment test engine is further to remove a load, halt a workload and release resources allocated to a deployment configuration under test at a completion of data collection for the deployment configuration under test.

Example 16

According to this example there is provided a method. The method includes generating, by a deployment recipe generator, a plurality of deployment recipes. The method further includes testing, by a deployment test engine, each of a plurality of deployment configurations. Each deployment configuration corresponds to a respective deployment recipe. The method further includes determining, by data analysis logic, a deployment rule based, at least in part, on deployment heuristics.

Example 17

This example includes the elements of example 16, further including collecting, by metrics collection logic, telemetry data for each deployment configuration.

Example 18

This example includes the elements of example 16, further including allocating, by the deployment test engine, each of the plurality of deployment configurations in a resource pool.

Example 19

This example includes the elements of example 16, further including determining, by efficiency logic, an efficiency value for each deployment rule of a plurality of deployment rules.

Example 20

This example includes the elements of example 19, further including ranking, by the efficiency logic, each deployment rule based, at least in part, on respective efficiency values.

Example 21

This example includes the elements of example 16, further including determining, by an orchestrator, a first deployment recipe based, at least in part, on a target performance value and based, at least in part, on a first deployment rule associated with a workload.

Example 22

This example includes the elements of example 21, further including allocating, by the orchestrator, resources specified by the first deployment recipe; and placing, by the orchestrator, the workload.

Example 23

This example includes the elements of example 22, further including monitoring, by metrics collection logic, performance; and updating, by the data analysis logic, the first deployment rule if a performance parameter is not at the target performance value.

Example 24

This example includes the elements of example 16, wherein each of the plurality of deployment recipes is determined based, at least in part, on configuration data.

Example 25

This example includes the elements of example 24, wherein the configuration data includes at least one resource descriptor, each resource descriptor corresponding to a respective resource type.

Example 26

This example includes the elements of example 25, wherein each resource descriptor includes a resource variant identifier and a value corresponding to a quantity of the respective resource type.

Example 27

This example includes the elements of example 24, wherein the configuration data further includes at least one performance parameter descriptor for each performance parameter associated with a workload.

Example 28

This example includes the elements of example 18, wherein each of the plurality of deployment configurations is allocated to a virtual machine or to a container instance in the resource pool.

Example 29

This example includes the elements of example 17, wherein the telemetry data includes one or more of processor usage, network usage, cache misses, memory usage, memory latency, throughput, number of instructions per second and/or workload specific metrics.

Example 30

This example includes the elements of example 16, further including removing, by the deployment test engine, a load; halting, by the deployment test engine, a workload; and releasing, by the deployment test engine, resources allocated to a deployment configuration under test at a completion of data collection for the deployment configuration under test.

Example 31

According to this example, there is provided a computer readable storage device. The device has stored thereon instructions that when executed by one or more processors result in the following operations including: generating a plurality of deployment recipes; testing each of a plurality of deployment configurations, each deployment configuration corresponding to a respective deployment recipe; and determining a deployment rule based, at least in part, on deployment heuristics.

Example 32

This example includes the elements of example 31, wherein the instructions that when executed by one or more processors results in the following additional operations including collecting telemetry data for each deployment configuration.

Example 33

This example includes the elements of example 31, wherein the instructions that when executed by one or more processors results in the following additional operations including allocating each of the plurality of deployment configurations in a resource pool.

Example 34

This example includes the elements according to any one of examples 31 to 33, wherein the instructions that when executed by one or more processors results in the following additional operations including determining an efficiency value for each deployment rule of a plurality of deployment rules.

Example 35

This example includes the elements of example 34, wherein the instructions that when executed by one or more processors results in the following additional operations including ranking each deployment rule based, at least in part, on respective efficiency values.

Example 36

This example includes the elements according to any one of examples 31 to 33, wherein the instructions that when executed by one or more processors results in the following additional operations including determining a first deployment recipe based, at least in part, on a target performance value and based, at least in part, on a first deployment rule associated with a workload.

Example 37

This example includes the elements of example 36, wherein the instructions that when executed by one or more processors results in the following additional operations including allocating resources specified by the first deployment recipe; and placing the workload.

Example 38

This example includes the elements of example 37, wherein the instructions that when executed by one or more processors results in the following additional operations including monitoring performance; and updating the first deployment rule if a performance parameter is not at the target performance value.

Example 39

This example includes the elements according to any one of examples 31 to 33, wherein each of the plurality of deployment recipes is determined based, at least in part, on configuration data.

Example 40

This example includes the elements of example 39, wherein the configuration data includes at least one resource descriptor, each resource descriptor corresponding to a respective resource type.

Example 41

This example includes the elements of example 40, wherein each resource descriptor includes a resource variant identifier and a value corresponding to a quantity of the respective resource type.

Example 42

This example includes the elements of example 39, wherein the configuration data further includes at least one performance parameter descriptor for each performance parameter associated with a workload.

Example 43

This example includes the elements of example 33, wherein each of the plurality of deployment configurations is allocated to a virtual machine or to a container instance in the resource pool.

Example 44

This example includes the elements of example 32, wherein the telemetry data includes one or more of processor usage, network usage, cache misses, memory usage, memory latency, throughput, number of instructions per second and/or workload specific metrics.

Example 45

This example includes the elements according to any one of examples 31 to 33, wherein the instructions that when executed by one or more processors results in the following additional operations removing a load; halting a workload; and releasing resources allocated to a deployment configuration under test at a completion of data collection for the deployment configuration under test.

Example 46

According to this example, there is provided a device. The device includes means for generating, by a deployment recipe generator, a plurality of deployment recipes. The device further includes means for testing, by a deployment test engine, each of a plurality of deployment configurations. Each deployment configuration corresponds to a respective deployment recipe. The device further includes means for determining, by data analysis logic, a deployment rule based, at least in part, on deployment heuristics.

Example 47

This example includes the elements of example 46, further including means for collecting, by metrics collection logic, telemetry data for each deployment configuration.

Example 48

This example includes the elements of example 46, further including means for allocating, by the deployment test engine, each of the plurality of deployment configurations in a resource pool.

Example 49

This example includes the elements according to any one of examples 46 to 48, further including means for determining, by efficiency logic, an efficiency value for each deployment rule of a plurality of deployment rules.

Example 50

This example includes the elements of example 49, further including means for ranking, by the efficiency logic, each deployment rule based, at least in part, on respective efficiency values.

Example 51

This example includes the elements according to any one of examples 46 to 48, further including means for determining, by an orchestrator, a first deployment recipe based, at least in part, on a target performance value and based, at least in part, on a first deployment rule associated with a workload.

Example 52

This example includes the elements of example 51, further including means for allocating, by the orchestrator, resources specified by the first deployment recipe; and means for placing, by the orchestrator, the workload.

Example 53

This example includes the elements of example 52, further including means for monitoring, by metrics collection logic, performance; and means for updating, by the data analysis logic, the first deployment rule if a performance parameter is not at the target performance value.

Example 54

This example includes the elements according to any one of examples 46 to 48, wherein each of the plurality of deployment recipes is determined based, at least in part, on configuration data.

Example 55

This example includes the elements of example 54, wherein the configuration data includes at least one resource descriptor, each resource descriptor corresponding to a respective resource type.

Example 56

This example includes the elements of example 55, wherein each resource descriptor includes a resource variant identifier and a value corresponding to a quantity of the respective resource type.

Example 57

This example includes the elements of example 54, wherein the configuration data further includes at least one performance parameter descriptor for each performance parameter associated with a workload.

Example 58

This example includes the elements of example 48, wherein each of the plurality of deployment configurations is allocated to a virtual machine or to a container instance in the resource pool.

Example 59

This example includes the elements of example 47, wherein the telemetry data includes one or more of processor usage, network usage, cache misses, memory usage, memory latency, throughput, number of instructions per second and/or workload specific metrics.

Example 60

This example includes the elements according to any one of examples 46 to 48, further including means for removing, by the deployment test engine, a load; means for halting, by the deployment test engine, a workload; and means for releasing, by the deployment test engine, resources allocated to a deployment configuration under test at a completion of data collection for the deployment configuration under test.

Example 61

According to this example, there is provided a system. The system includes at least one device arranged to perform the method of any one of examples 16 to 30.

Example 62

According to this example, there is provided a device. The device includes means to perform the method of any one of examples 16 to 30.

Example 63

According to this example, there is provided a computer readable storage device. The device has stored thereon instructions that when executed by one or more processors result in the following operations including: the method according to any one of examples 16 to 30.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
at least one memory to store program instructions; and
at least one processor to execute the program instructions from the at least one memory, the program instructions causing the at least one processor to programmatically implement:
  a deployment recipe generator to generate a plurality of deployment recipes identifying physical and virtual resources usable to implement a plurality of deployment configurations to test a workload configured based on an intended use of the resources, and determine test intervals specific to each of the plurality of deployment configurations based on the test intervals based on at least one type of resource included in each of the plurality of deployment configurations;
  a deployment test engine to test each of the plurality of deployment configurations utilizing at least the identified resources to process the workload over the interval;
  metrics collection logic to collect telemetry data for each deployment configuration; and
  data analysis logic to determine deployment heuristics utilizing performance parameters determined based at least on the telemetry data, and determine a deployment rule based, at least in part, on the deployment heuristics.

2. The apparatus of claim 1, wherein the deployment test engine is to allocate each of the plurality of deployment configurations in a resource pool.

3. The apparatus of claim 1, further comprising efficiency logic to determine an efficiency value for each deployment rule of a plurality of deployment rules.

4. The apparatus of claim 3, wherein the efficiency logic is further to rank each deployment rule based, at least in part, on respective efficiency values.

5. The apparatus of claim 1, further comprising an orchestrator to determine a first deployment recipe based, at least in part, on a target performance value and based, at least in part, on a first deployment rule associated with a workload.

6. The apparatus of claim 5, wherein the orchestrator is to allocate resources specified by the first deployment recipe and to place the workload.

7. The apparatus of claim 6, further comprising metrics collection logic to monitor performance, the data analysis logic further to update the first deployment rule if a performance parameter is not at the target performance value.

8. A method comprising:
generating, by a deployment recipe generator, a plurality of deployment recipes identifying physical and virtual resources usable to implement a plurality of deployment configurations to test a workload configured based on an intended use of the resources, and determining test intervals specific to each of the plurality of deployment configurations based on the test intervals based on at least one type of resource included in each of the plurality of deployment configurations;
testing, by a deployment test engine, each of the plurality of deployment configurations utilizing at least the identified resources to process the workload over the interval;
collecting, by metrics collection logic, telemetry data for each deployment configuration;
determining, by data analysis logic, deployment heuristics utilizing performance parameters determined based at least on the telemetry data; and
determining, by the data analysis logic, a deployment rule based, at least in part, on the deployment heuristics.

9. The method of claim 8, further comprising allocating, by the deployment test engine, each of the plurality of deployment configurations in a resource pool.

10. The method of claim 8, further comprising determining, by efficiency logic, an efficiency value for each deployment rule of a plurality of deployment rules.

11. The method of claim 10, further comprising ranking, by the efficiency logic, each deployment rule based, at least in part, on respective efficiency values.

12. The method of claim 8, further comprising determining, by an orchestrator, a first deployment recipe based, at least in part, on a target performance value and based, at least in part, on a first deployment rule associated with a workload.

13. The method of claim 12, further comprising allocating, by the orchestrator, resources specified by the first deployment recipe; and placing, by the orchestrator, the workload.

14. The method of claim 13, further comprising monitoring, by metrics collection logic, performance; and updating, by the data analysis logic, the first deployment rule if a performance parameter is not at the target performance value.

15. A non-transitory computer readable storage device having stored thereon instructions that when executed by one or more processors result in the following operations comprising:
generating a plurality of deployment recipes identifying physical and virtual resources usable to implement a plurality of deployment configurations to test a workload configured based on an intended use of the resources, and determining test intervals specific to each of the plurality of deployment configurations based on the test intervals based on at least one type of resource included in each of the plurality of deployment configurations;
testing each of a plurality of deployment configurations utilizing at least the identified resources to process the workload over the interval;
collecting telemetry data for each deployment configuration;
determining deployment heuristics utilizing performance parameters determined based at least on the telemetry data; and
determining a deployment rule based, at least in part, on the deployment heuristics.

16. The device of claim 15, wherein the instructions that when executed by one or more processors results in the following additional operations comprising allocating each of the plurality of deployment configurations in a resource pool.

17. The device of claim 15, wherein the instructions that when executed by one or more processors results in the following additional operations comprising determining an efficiency value for each deployment rule of a plurality of deployment rules.

18. The device of claim 17, wherein the instructions that when executed by one or more processors results in the following additional operations comprising ranking each deployment rule based, at least in part, on respective efficiency values.

19. The device of claim 15, wherein the instructions that when executed by one or more processors results in the following additional operations comprising determining a first deployment recipe based, at least in part, on a target performance value and based, at least in part, on a first deployment rule associated with a workload.

20. The device of claim 19, wherein the instructions that when executed by one or more processors results in the following additional operations comprising allocating resources specified by the first deployment recipe; and placing the workload.

21. The device of claim 20, wherein the instructions that when executed by one or more processors results in the following additional operations comprising monitoring performance; and updating the first deployment rule if a performance parameter is not at the target performance value.

* * * * *